United States Patent
Hsieh

(10) Patent No.: US 10,216,358 B2
(45) Date of Patent: Feb. 26, 2019

(54) TOUCH DISPLAY APPARATUS AND OPERATING METHOD THEREOF

(71) Applicant: Acer Incorporated, New Taipei (TW)

(72) Inventor: Yu-Chi Hsieh, New Taipei (TW)

(73) Assignee: Acer Incorporated, New Taipei (TW)

( * ) Notice: Subject to any disclaimer, the term of this patent is extended or adjusted under 35 U.S.C. 154(b) by 296 days.

(21) Appl. No.: 14/262,784

(22) Filed: Apr. 27, 2014

(65) Prior Publication Data

US 2015/0212690 A1    Jul. 30, 2015

(30) Foreign Application Priority Data

Jan. 28, 2014  (TW) .............................. 103103298 A

(51) Int. Cl.
| | | |
|---|---|---|
| *G06F 3/048* | (2013.01) | |
| *G06F 3/0481* | (2013.01) | |
| *G06F 3/0488* | (2013.01) | |
| *G06F 3/0484* | (2013.01) | |

(52) U.S. Cl.
CPC ........ *G06F 3/04817* (2013.01); *G06F 3/0488* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 9,430,128 B2 * | 8/2016 | Hayes | ................. | G06F 3/04883 |
| 2006/0242607 A1 * | 10/2006 | Hudson | ............... | G06F 3/04817 |
| | | | | 715/863 |
| 2007/0177803 A1 | 8/2007 | Elias et al. | | |
| 2012/0054620 A1 * | 3/2012 | Tilley | .................... | G06F 1/1626 |
| | | | | 715/727 |
| 2013/0097538 A1 | 4/2013 | Park et al. | | |
| 2013/0169559 A1 | 7/2013 | Peng | | |
| 2014/0129930 A1 * | 5/2014 | Bi | ........................ | G06F 3/04886 |
| | | | | 715/261 |
| 2014/0165012 A1 * | 6/2014 | Shen | ..................... | G06F 9/4451 |
| | | | | 715/863 |

FOREIGN PATENT DOCUMENTS

| | | |
|---|---|---|
| CN | 101349944 | 1/2009 |
| CN | 102073439 | 5/2011 |
| CN | 102866803 | 1/2013 |
| CN | 102955670 | 3/2013 |

(Continued)

OTHER PUBLICATIONS

Alltechinside: "Nova Launcher Prime Review!", Nov. 13, 2012, Retrieved from the Internet: URL:https://www.youtube.com/watch?v=JIN7tv1np1k.

(Continued)

*Primary Examiner* — William C Trapanese

(74) *Attorney, Agent, or Firm* — JCIPRNET

(57) ABSTRACT

A touch display apparatus and an operating method of the touch display apparatus are provided. An application icon is converted into a corresponding startup gesture icon if a touch operation conforms to an icon conversion operation. Here, the startup gesture icon indicates a gesture operation required for starting up an application corresponding to the startup gesture icon.

12 Claims, 5 Drawing Sheets

(56) References Cited

FOREIGN PATENT DOCUMENTS

| CN | 103226389 | 7/2013 | | |
|----|-----------|--------|----|----|
| EP | 2711805 A1 * | 3/2014 | ............. | G06K 9/222 |
| TW | 201135527 | 10/2011 | | |
| TW | 201145110 | 12/2011 | | |
| TW | 201401148 | 1/2014 | | |
| WO | 2012142044 | 10/2012 | | |

OTHER PUBLICATIONS

Anonymous, "Keyboard shortcuts—HowTo—Outlook" Jan. 19, 2011, Available at: http://www.howto-outlook.com/howto/keyboardshortcuts.htm.

* cited by examiner

TOUCH DISPLAY APPARATUS AND OPERATING METHOD THEREOF

CROSS-REFERENCE TO RELATED APPLICATION

This application claims the priority benefit of Taiwan application serial no. 103103298, filed on Jan. 28, 2014. The entirety of the above-mentioned patent application is hereby incorporated by reference herein and made a part of this specification.

FIELD OF THE INVENTION

The invention relates to an electronic apparatus; more particularly, the invention relates to a touch display apparatus and an operating method thereof.

DESCRIPTION OF RELATED ART

In the existing smart handheld apparatuses, touch panels are often employed as user input devices. Through the touch panels, the users click on application icons to start up the applications. However, application icons are generally distributed onto the entire display panel; therefore, once a smart handheld apparatus with the large-size dimension is employed, the applications often need be started up by holding the handheld apparatus with one hand and clicking on the icons with the other hand.

In order to resolve said issue at this current stage, users are required to set up and memorize startup gestures corresponding to the applications. However, the smart handheld apparatuses often contain dozens or even hundreds of applications; if the users are required to memorize the startup gestures (corresponding to the applications) one by one, the smart handheld apparatuses cannot be used with ease.

SUMMARY OF THE INVENTION

The invention is directed to a touch display apparatus and an operating method thereof to facilitate the use of the touch display apparatus.

In an embodiment of the invention, a touch display apparatus that includes a touch display panel, a storage unit, and a control unit is provided. The touch display panel displays at least one application icon and senses a touch operation of an input tool. The storage unit stores a plurality of startup gesture icons. The control unit is coupled to the touch display panel and the storage unit. If the touch operation conforms to an icon conversion operation, the control unit controls the touch display panel to convert the application icon into one of the startup gesture icons corresponding to the application icon. Here, the one of the startup gesture icons indicates a gesture operation required for starting up an application corresponding to the one of the startup gesture icons.

According to an embodiment of the invention, after the application icon displayed on the touch display panel is converted into the one of the startup gesture icons corresponding to the application icon, the control unit determines whether the touch display panel senses the touch operation conforming to the gesture operation, and the control unit starts up the application corresponding to the gesture operation if the touch display panel senses the touch operation conforming to the gesture operation.

According to an embodiment of the invention, if the touch display apparatus performs an initialization process or installs a new application, the control unit further selects one of the startup gesture icons corresponding to the new application installed by the touch display apparatus.

According to an embodiment of the invention, the icon conversion operation includes a clicking operation and a sliding operation.

According to an embodiment of the invention, the control unit further sets the one of the startup gesture icons corresponding to the application icon according to a startup gesture icon setting command.

According to an embodiment of the invention, after the application icon is converted into the one of the startup gesture icons corresponding to the application icon, the control unit further determines whether the touch display panel does not sense the touch operation conforming to the one of the startup gesture icons after a predetermined period, and the control unit controls the touch display panel to be switched back to display the application icon if the touch display panel does not sense the touch operation conforming to the one of the startup gesture icons after the predetermined period.

In an embodiment of the invention, an operating method of a touch display apparatus includes following steps. A touch operation of an input tool is detected. Whether the touch operation conforms to an icon conversion operation is determined. If the touch operation conforms to the icon conversion operation, the touch display apparatus is controlled to convert at least one application icon into one of a plurality of startup gesture icons corresponding to the application icon. Here, the one of the startup gesture icons indicates a gesture operation required for starting up an application corresponding to the one of the startup gesture icons. Whether the touch display apparatus senses the touch operation conforming to the gesture operation is determined. If the touch display apparatus senses the touch operation conforming to the gesture operation, the application corresponding to the gesture operation is started up.

According to an embodiment of the invention, the touch display apparatus includes a storage unit storing the startup gesture icons, and the operating method further includes determining whether the touch display apparatus performs an initialization process or installs a new application; if the touch display apparatus performs the initialization process or installs the new application, one of the startup gesture icons corresponding to the new application installed by the touch display apparatus is selected.

According to an embodiment of the invention, the icon conversion operation includes a clicking operation and a sliding operation.

According to an embodiment of the invention, the operating method of the touch display apparatus further includes determining whether a startup gesture icon setting command is received; if the startup gesture icon setting command is received, the one of the startup gesture icons corresponding to the application icon is set according to the startup gesture icon setting command.

According to an embodiment of the invention, the step of determining whether the touch display apparatus senses the touch operation conforming to the gesture operation includes determining whether the touch display apparatus does not sense the touch operation conforming to the one of the startup gesture icons after a predetermined period.

According to an embodiment of the invention, the operating method of the touch display apparatus further includes controlling the touch display apparatus to be switched back to display the application icon if the touch display apparatus does not sense the touch operation conforming to the one of the startup gesture icons after the predetermined period.

In view of the above, according to an embodiment of the invention, the startup gesture icon corresponding to the application is spontaneously set, and the application icon is converted into the corresponding startup gesture icon. Thereby, the one-hand touch operation performed on the touch display apparatus becomes easy. Besides, the users are no longer required for setting and memorizing the startup gesture icons respectively corresponding to individual applications in a one-by-one manner, such that the use of the touch display apparatus may be significantly facilitated.

Several exemplary embodiments accompanied with figures are described in detail below to further describe the invention in details.

DETAILED DESCRIPTION OF DISCLOSED EMBODIMENTS

Figure 1:
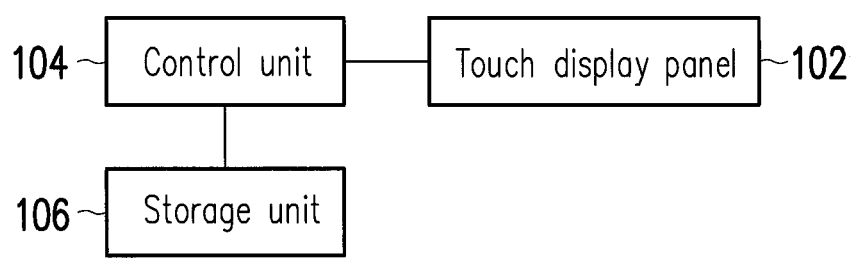
FIG. 1 is a schematic view illustrating a touch display apparatus according to an embodiment of the invention.

FIG. 1 is a schematic view illustrating a touch display apparatus according to an embodiment of the invention. With reference to FIG. 1, a touch display apparatus includes a touch display panel 102, a control unit 104, and a storage unit 106, and the touch display panel 102 is coupled to the control unit 104. The touch display panel 102 is capable of displaying at least one application icon and sensing a touch operation of an input tool. The input tool may be a finger, a stylus, or the like, for instance. The storage unit 106 stores a plurality of startup gesture icons. The control unit 104 is able to determine whether the touch operation sensed by the touch display panel 102 conforms to an icon conversion operation. If the touch operation conforms to the icon conversion operation, the control unit 104 controls the touch display panel 102 to convert the application icon into one of the startup gesture icons corresponding to the application icon. Here, the one of the startup gesture icons indicates a gesture operation required for starting up an application corresponding to the one of the startup gesture icons. The icon conversion operation includes a clicking operation and a sliding operation; for instance, when the input tool touches the touch display panel 102, the control unit 104 immediately controls the touch display panel 102 to convert the application icon into the startup gesture icon.

Figure 2:
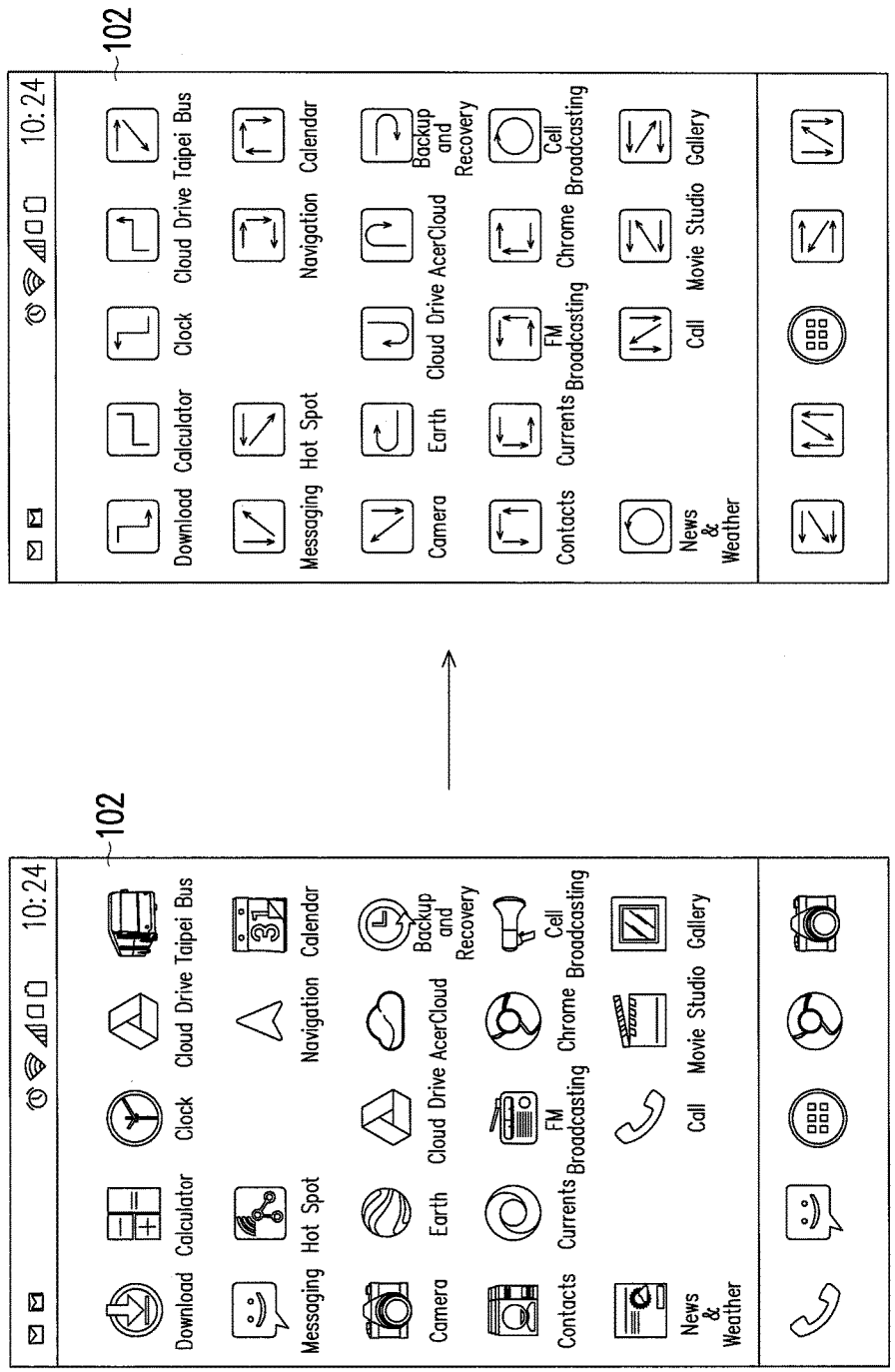
FIG. 2 is a schematic view illustrating conversion of application icons into startup gesture icons according to an embodiment of the invention.

FIG. 2 is a schematic view illustrating conversion of application icons into startup gesture icons according to an embodiment of the invention. With reference to FIG. 2, the touch display panel 102 displays a plurality of application icons. If the control unit 104 determines that the touch operation sensed by the touch display panel 102 conforms to the icon conversion operation, the application icons displayed by the touch display panel 102 are converted into the startup gesture icons. As shown in FIG. 2, each application icon is respectively converted into the corresponding startup gesture icon. For instance, the application icon "News & Weather" is converted into a startup gesture icon which instructs a user to draw a circle in a counterclockwise direction; after the user draws a circle in a counterclockwise direction on the touch display panel 102 according to the instruction from the startup gesture icon, and the control unit 104 determines that the user's touch operation conforms to the gesture operation instructed by the startup gesture icon corresponding to the application icon "News & Weather", the control unit 104 starts up the application "News & Weather".

Thereby, when the user holds the touch display apparatus with his or her right hand, the user is no longer unable to click on the application icon "News & Weather" due to insufficient length of fingers. What is more, the user is no longer required to memorize the startup gesture icons respectively corresponding to the individual applications, such that the use of the touch display apparatus can be facilitated to a great extent. After the application icons displayed by the touch display panel 102 are converted into the corresponding startup gesture icons, note that the user not only may perform the touch operations according to the startup gesture icons to start up the corresponding applications but also can directly click on the application icons to start up the applications. Namely, the conventional way to start up the applications by clicking on the application icons is also acceptable to the touch display apparatus. If the application icons are located at a distance from the fingers of the user, the applications corresponding to these application icons may be started up by performing the touch operations according to the startup gesture icons. Hence, in an embodiment of the invention, it is possible to merely convert parts of the application icons displayed by the touch display panel 102 (e.g., the application icons far away from the user's fingers) into the startup gesture icons, and the application icons that can be touched by the user's fingers are not converted into the startup gesture icons.

After the application icons are converted into the startup gesture icons corresponding to the application icons, the control unit 104 further determines whether the touch display panel does not sense the touch operations conforming to the startup gesture icons or senses the touch operations that do not conform to the startup gesture icons after a predetermined period; if so, the control unit 104 controls the touch display panel 102 to be switched back to display the originally displayed application icons. According to an embodiment of the invention, the control unit 104 may immediately control the touch display panel 102 to be switched back to display the originally displayed application icons right after the input tool stops touching the touch display panel 102, i.e., right after the input tool stops the touch operations.

Moreover, if the touch display apparatus performs an initialization process or installs a new application, the control unit 104 may, from the startup gesture icons stored in the storage unit 106, select one of the startup gesture icons corresponding to the new application installed by the touch display apparatus, such that the setting step may be omitted, and the convenience of using the touch display apparatus can be enhanced. Certainly, the user may set the startup gesture icons corresponding to the applications by himself or herself. Specifically, after the control unit 104 receives a startup gesture icon setting command from the user, the control unit 104 sets the startup gesture icons corresponding to the application icons according to the startup gesture icon setting command.

Figure 3:
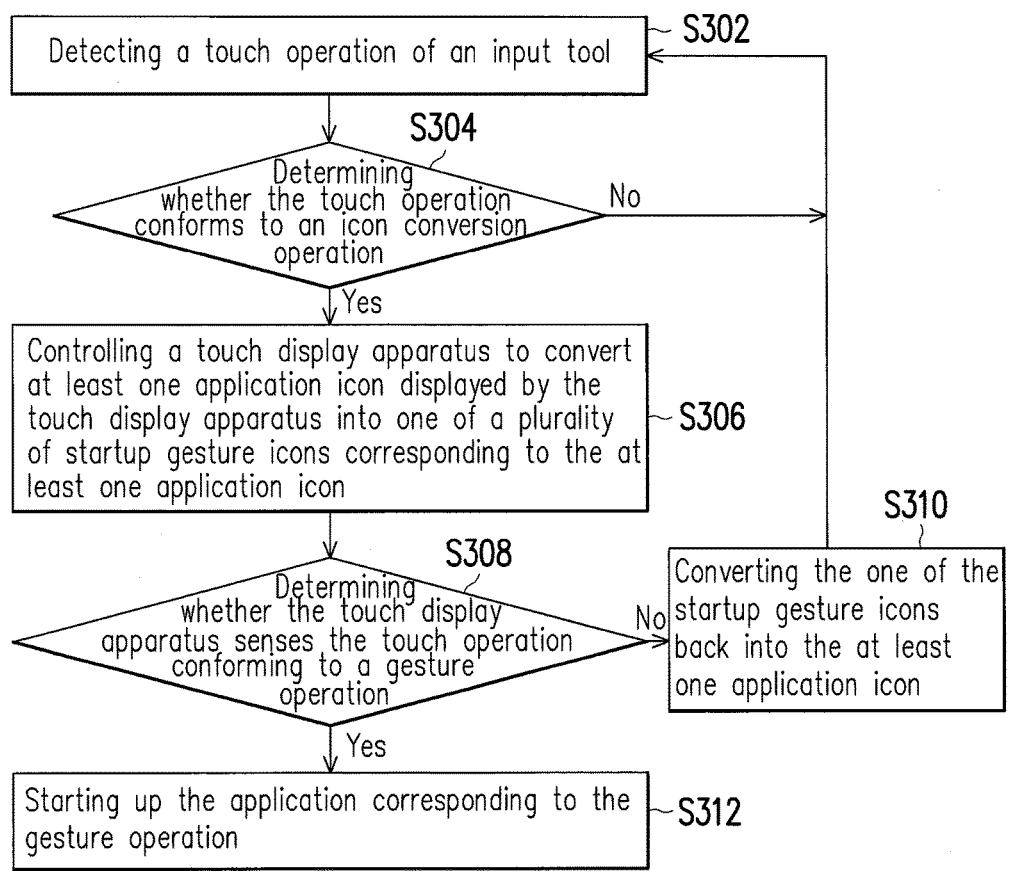
FIG. 3 is a schematic flowchart of an operating method of a touch display apparatus according to an embodiment of the invention.

FIG. 3 is a schematic flowchart of an operating method of a touch display apparatus according to an embodiment of the invention. With reference to FIG. 3, the operating method of said touch display apparatus may include following steps. In step S302, a touch operation of an input tool is detected wherein the input tool may be a finger, a stylus, and so on, for instance. In step S304, whether the touch operation performed by the input tool conforms to an icon conversion operation is determined, wherein the icon conversion operation includes a clicking operation and a sliding operation, for instance. If the touch operation performed by the input tool does not confirm to the icon conversion operation, go back to step S302 and continue detecting another touch operation of the input tool. By contrast, if the touch operation conforms to the icon conversion operation, the touch display apparatus is controlled to convert at least one application icon displayed by the touch display apparatus into one of a plurality of startup gesture icons corresponding to the application icon (step S306). Here, the one of the startup gesture icons indicates a gesture operation required for starting up an application corresponding to the one of the startup gesture icons. In step S308, whether the touch display apparatus senses the touch operation conforming to the gesture operation is determined. If the touch display apparatus does not sense the touch operation that conforms to the gesture operation, the one of the startup gesture icons is converted back into the application icon in step S310. Besides, go back to step S302 and continue detecting another touch operation of the input tool. On the contrary, if the touch display apparatus senses the touch operation conforming to the gesture operation, the application corresponding to the gesture operation is started up.

Figure 4:
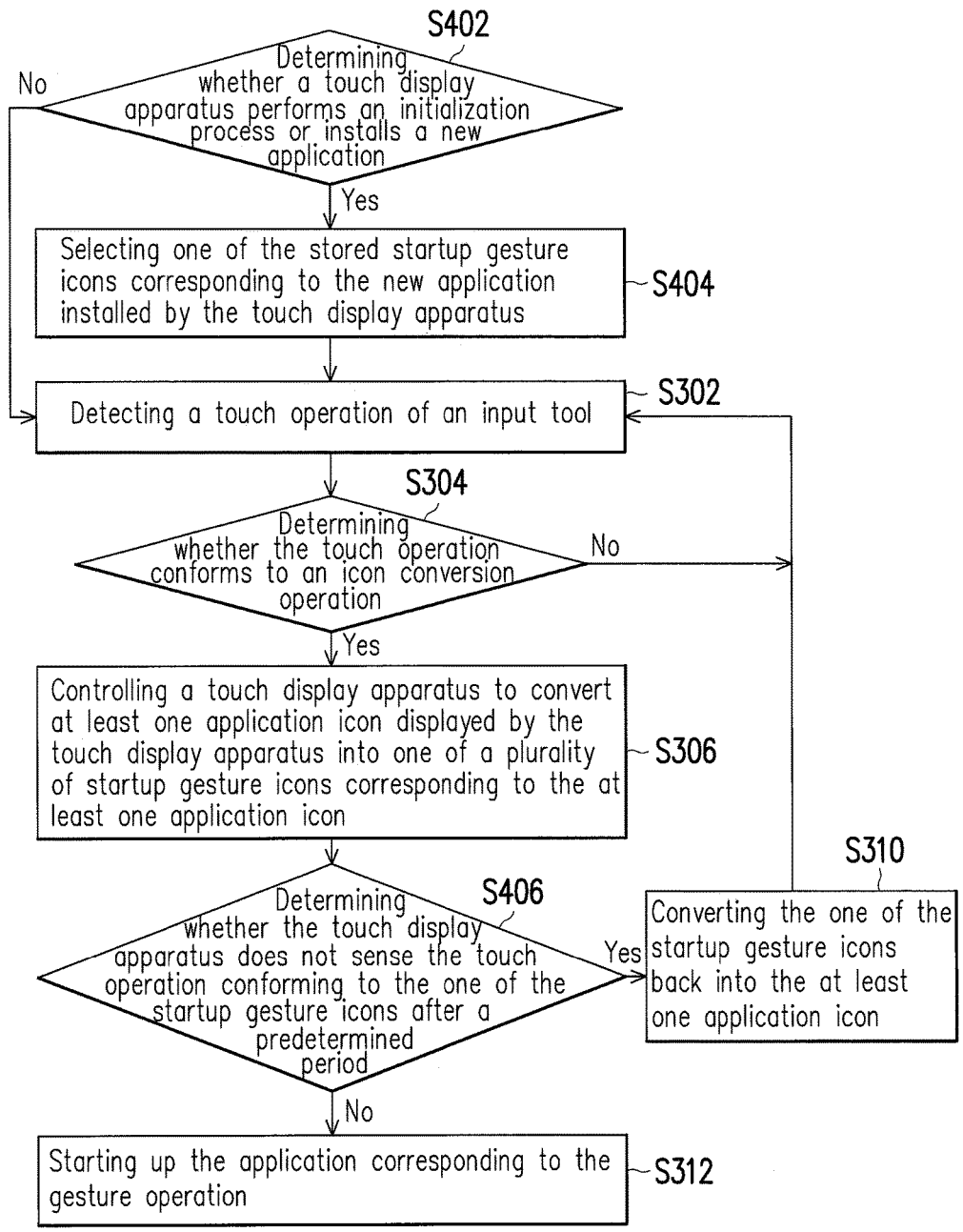
FIG. 4 is a schematic flowchart of an operating method of a touch display apparatus according to another embodiment of the invention.

FIG. 4 is a schematic flowchart of an operating method of a touch display apparatus according to another embodiment of the invention. The difference between the present embodiment and the embodiment shown in FIG. 3 lies in the steps S402 to S406 are further included in the present embodiment. In step S402, whether a touch display apparatus performs an initialization process or installs a new application is determined. If the touch display apparatus does not perform the initialization process nor installs the new application, the step S302 is performed to detect the touch operation of the input tool. If the touch display apparatus performs the initialization process or installs the new application, one of the stored startup gesture icons corresponding to the new application installed by the touch display apparatus is selected in step S404, and the step S302 is then performed to detect the touch operation of the input tool. According to the present embodiment, the step S308 shown in FIG. 3 may be replaced by step S406, i.e., a step of determining whether the touch display apparatus does not sense the touch operation conforming to the one of the startup gesture icons after a predetermined period. If the touch display apparatus does not sense the touch operation conforming to the one of the startup gesture icons after the predetermined period, the step S310 is performed to convert the one of the startup gesture icons back into the application icon; if the touch display apparatus senses the touch operation conforming to the one of the startup gesture icons after the predetermined period, the step S312 is performed to start up the application corresponding to the gesture operation.

Figure 5:
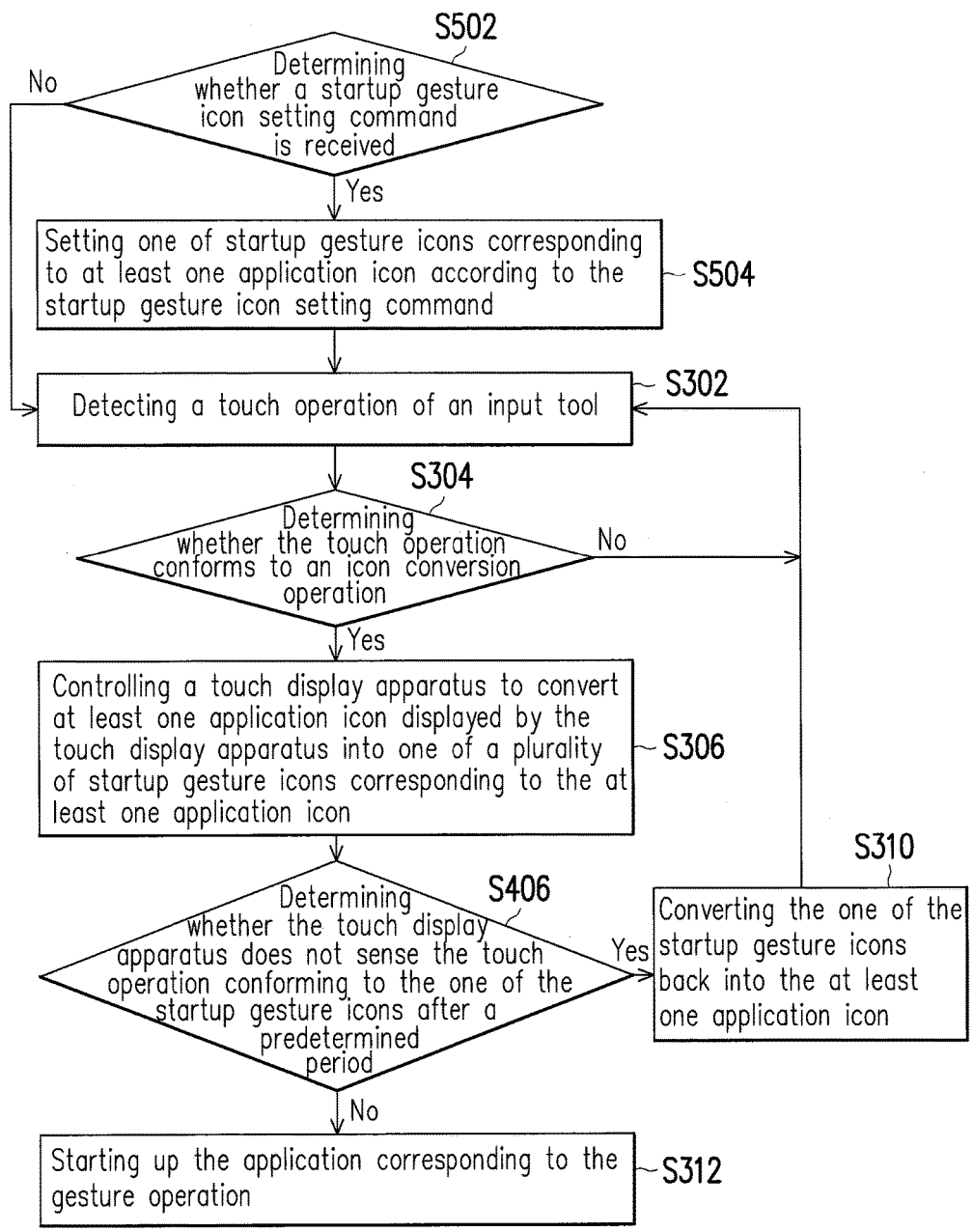
FIG. 5 is a schematic flowchart of an operating method of a touch display apparatus according to another embodiment of the invention.

FIG. 5 is a schematic flowchart of an operating method of a touch display apparatus according to another embodiment of the invention. The difference between the present embodiment and the embodiment shown in FIG. 4 lies in that the operating method of the touch display apparatus described in the present embodiment further includes steps S502 and S504 before step S302 is performed. In step S502, whether a startup gesture icon setting command is received is determined. Here, the startup gesture icon setting command is a command issued according to the startup gesture icons corresponding to the application icons set by the user. If the startup gesture icon setting command is not received, the step S302 is performed to detect a touch operation of an input tool. If the startup gesture icon setting command is received, in step S504, the one of the startup gesture icons corresponding to the application icon is set according to the startup gesture icon setting command, and the step S302 is performed to detect a touch operation of an input tool.

To sum up, according to an embodiment of the invention, the startup gesture icon corresponding to the application is spontaneously set, and the application icon is converted into the corresponding startup gesture icon. Thereby, the one-hand touch operation performed on the touch display apparatus becomes easy. Besides, the users are no longer required for setting and memorizing the startup gesture icons respectively corresponding to individual applications in a one-by-one manner, such that the use of the touch display apparatus may be significantly facilitated.

What is claimed is:

1. A touch display apparatus comprising:
    a touch display panel displaying at least one application icon and sensing a touch operation of an input tool;
    a storage unit storing a plurality of startup gesture icons; and
    a control unit coupled to the touch display panel and the storage unit, if the touch operation conforms to an icon conversion operation, the control unit controlling the touch display panel to convert the at least one application icon into one of the startup gesture icons corresponding to the at least one application icon, wherein the one of the startup gesture icons indicates a touch gesture operation required for starting up an application corresponding to the one of the startup gesture icons, wherein each of the startup gesture icons is displayed inside a range where the corresponding application icon is displayed, and a moving track of the touch gesture operation does not overlap a track displayed on the startup gesture icon of the started application, and a touch area for sensing the touch gesture operation equals to a touch area of the touch display panel, wherein application icons that cannot be touched by fingers of a hand of a user who is holding the touch display apparatus are converted, the application icons that can be touched by the fingers of the hand of the user who is holding the touch display apparatus are not converted.

2. The touch display apparatus as recited in claim 1, wherein after the at least one application icon displayed on the touch display panel is converted into the one of the startup gesture icons corresponding to the at least one application icon, the control unit determines whether the touch display panel senses the touch operation conforming to the touch gesture operation, and the control unit starts up the application corresponding to the touch gesture operation if the touch display panel senses the touch operation conforming to the touch gesture operation.

3. The touch display apparatus as recited in claim 1, wherein if the touch display apparatus performs an initialization process or installs a new application, the control unit further selects one of the startup gesture icons corresponding to the new application installed by the touch display apparatus.

4. The touch display apparatus as recited in claim 1, wherein the icon conversion operation comprises a clicking operation and a sliding operation.

5. The touch display apparatus as recited in claim 1, the control unit further setting the one of the startup gesture icons corresponding to the at least one application icon according to a startup gesture icon setting command.

6. The touch display apparatus as recited in claim 1, wherein after the at least one application icon is converted into the one of the startup gesture icons corresponding to the at least one application icon, the control unit further determines whether the touch display panel does not sense the touch operation conforming to the one of the startup gesture icons after a predetermined period, and the control unit controls the touch display panel to be switched back to display the at least one application icon if the touch display panel does not sense the touch operation conforming to the one of the startup gesture icons after the predetermined period.

7. An operating method of a touch display apparatus, comprising:
    detecting a touch operation of an input tool;
    determining whether the touch operation conforms to an icon conversion operation;
    if the touch operation conforms to the icon conversion operation, controlling the touch display apparatus to convert at least one application icon into one of a plurality of startup gesture icons corresponding to the at least one application icon, wherein the one of the startup gesture icons indicates a touch gesture operation required for starting up an application corresponding to the one of the startup gesture icons;
    determining whether the touch display apparatus senses the touch operation conforming to the touch gesture operation; and
    starting up the application corresponding to the touch gesture operation if the touch display apparatus senses the touch operation conforming to the touch gesture operation, wherein each of the startup gesture icons is displayed inside a range where the corresponding application icon is displayed, and a moving track of the touch gesture operation does not overlap a track displayed on the startup gesture icon of the started application, and a touch area for sensing the touch gesture operation equals to a touch area of the touch display panel, wherein application icons that cannot be touched by fingers of a hand of a user who is holding the touch display apparatus are converted, the application icons that can be touched by the fingers of the hand of the user who is holding the touch display apparatus are not converted.

8. The operating method of the touch display apparatus as recited in claim 7, wherein the touch display apparatus comprises a storage unit storing the startup gesture icons, and the operating method further comprises:
    determining whether the touch display apparatus performs an initialization process or installs a new application; and
    if the touch display apparatus performs the initialization process or installs the new application, selecting one of the startup gesture icons corresponding to the new application installed by the touch display apparatus.

9. The operating method of the touch display apparatus as recited in claim 7, wherein the icon conversion operation comprises a clicking operation and a sliding operation.

10. The operating method of the touch display apparatus as recited in claim 7, further comprising:
    determining whether a startup gesture icon setting command is received; and
    if the startup gesture icon setting command is received, setting the one of the startup gesture icons corresponding to the at least one application icon according to the startup gesture icon setting command.

11. The operating method of the touch display apparatus as recited in claim 7, wherein the step of determining whether the touch display apparatus senses the touch operation conforming to the gesture operation comprises:
    determining whether the touch display apparatus does not sense the touch operation conforming to the one of the startup gesture icons after a predetermined period.

12. The operating method of the touch display apparatus as recited in claim 11, further comprising:
    if the touch display apparatus does not sense the touch operation conforming to the one of the startup gesture icons after the predetermined period, controlling the touch display apparatus to be switched back to display the at least one application icon.

* * * * *